(12) United States Patent
Sirkis et al.

(10) Patent No.: US 6,278,810 B1
(45) Date of Patent: Aug. 21, 2001

(54) MEASUREMENT OF DISTRIBUTED STRAIN AND TEMPERATURE BASED ON HIGHER ORDER AND HIGHER MODE BRAGG CONDITIONS

(75) Inventors: James S. Sirkis, Burtonsville; Ponniah Sivanesan, Greenbelt, both of MD (US); Venki S. Venkat, Yorktown, VA (US)

(73) Assignees: University of Maryland, College Park, MD (US); Analytical Services and Materials Inc., Hampton, VA (US)

( * ) Notice: Subject to any disclaimer, the term of this patent is extended or adjusted under 35 U.S.C. 154(b) by 0 days.

(21) Appl. No.: 09/393,631

(22) Filed: Sep. 10, 1999

Related U.S. Application Data
(60) Provisional application No. 60/099,785, filed on Sep. 10, 1998.

(51) Int. Cl.$^7$ .................................. G02B 6/00; G01J 1/04
(52) U.S. Cl. ................................ 385/12; 385/13; 385/37; 250/227.11; 250/227.14; 356/32
(58) Field of Search .................................. 385/12, 13, 28, 385/37; 250/227.11, 227.14, 227.18; 356/32

(56) References Cited

U.S. PATENT DOCUMENTS

| | | | |
|---|---|---|---|
| 5,208,877 | * 5/1993 | Murphy et al. | 385/12 |
| 5,696,863 | * 12/1997 | Kleinerman | 385/12 |
| 5,698,848 | * 12/1997 | Belk | 250/227.11 |
| 5,760,391 | * 6/1998 | Narendran | 250/227.14 |

OTHER PUBLICATIONS

Xu et al., *Electronic Letters*, 30 (13), pp. 1085–1087, 1994.
Brady et al., *IEEE Proc.–Optoelectrons*, vol. 144, No. 3, pp. 156–161, Jun. 1997.
Brady et al., "Recent Developments in Optical Fiber Sensing Using Fiber Bragg Gratings," *SPIE Proceedings*, Colorado, 1996, vol. 2839, pp. 8–14.
Faustini and Martini, "Bend Loss in Single Mode Fibers", *J. Lightwave Tech.*, vol. 15, No. 4, pp. 671–679, Apr. 1979.

* cited by examiner

Primary Examiner—Loha Ben
(74) Attorney, Agent, or Firm—Antonelli, Terry, Stout & Kraus, LLP

(57) ABSTRACT

A Bragg grating sensor for measuring distributed strain and temperature at the same time comprises an optical fiber having a single mode operating wavelength region and below a cutoff wavelength of the fiber having a multimode operating wavelength region. A saturated, higher order Bragg grating having first and second order Bragg conditions is fabricated in the optical fiber. The first order of Bragg resonance wavelength of the Bragg grating is within the single mode operating wavelength region of the optical fiber and the second order of Bragg resonance wavelength is below the cutoff wavelength of the fiber within the multimode operating wavelength region. The reflectivities of the saturated Bragg grating at the first and second order Bragg conditions are less than two orders of magnitude of one another. In use, the first and second order Bragg conditions are simultaneously created in the sensor at the respective wavelengths and a signal from the sensor is demodulated with respect to each of the wavelengths corresponding to the first and second order Bragg conditions. Two Bragg conditions have different responsivities to strain and temperature, thus allowing two equations for axial strain and temperature to be found in terms of the measure shifts in the primary and second order Bragg wavelengths. This system of equations can be solved for strain and temperature.

27 Claims, 8 Drawing Sheets

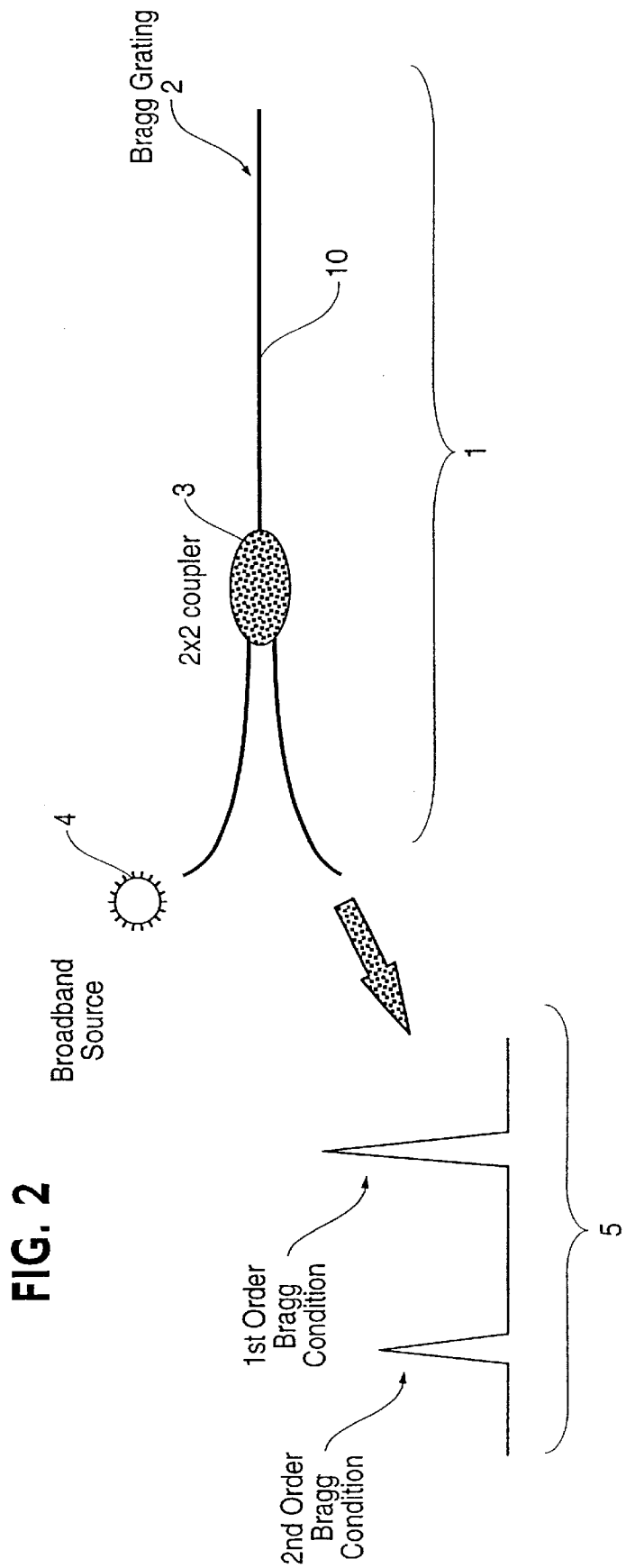

US 6,278,810 B1

MEASUREMENT OF DISTRIBUTED STRAIN AND TEMPERATURE BASED ON HIGHER ORDER AND HIGHER MODE BRAGG CONDITIONS

RELATED APPLICATION

Reference is made to copending provisional application Ser. No. 60/099,785, filed Sep. 10, 1998, priority of which is claimed under 35 U.S.C. §119. The disclosure of the provisional application is hereby incorporated by reference.

The invention was made with goverment support under Contract Number NAS 1 97149 awarded by NASA. The goverment has certain rights in the invention.

TECHNICAL FIELD

An optical fiber Bragg grating sensor, a method and an apparatus employing the same for measuring distributed strain and temperatures at the same time, are disclosed.

BACKGROUND

Optical fiber sensors capable of simultaneously measuring distributed strain and temperature have generated significant interest in the technical community. Current technologies have two limitations. They are either difficult to manufacture because they require multi-step manufacturing procedures or they have limited multiplexing potential. For example, the cascaded Bragg grating/extrinsic Fabry-Perot and intrinsic Fabry-Perot/extrinsic Fabry-Perot have excellent numerical stability, have proven very effective in measuring strain and temperature in combined thermomechanical fields, and satisfy the condition of having the same or similar gage lengths for the strain and temperature components of the sensor. However, the extrinsic Fabry-Perot component of the sensor is not always easy to manufacture, and has limited multiplexing potential (maximum of approximately 5 sensors). The other sensor configuration that is promising is the superposed grating configuration proposed by Xu et al., *Electronic Letters*, 30 (13), pp. 1085–1087, 1994. This technology does not enable cost effective manufacturing. Superposing two gratings is simply not compatible with present day Bragg grating mass production facilities available at Bragg grating manufacturers.

The concept of a two-Bragg condition grating sensor was recently proposed by Brady et al., *IEEE Proc.— Optoelectrons*, Vol. 144, No. 3, June 1997, pages 156–161. However, Brady et al. did not attempt to make simultaneous measurements of strain and temperature. They were only able to achieve ~0.1 percent reflectivities of second order Bragg condition. The small reflectivity of the second order Bragg condition of the grating necessitated the use of overly complex method of monitoring the two Bragg wavelengths.

SUMMARY

An improved Bragg grating sensor of the present invention for measuring distributed strain and temperature at the same time comprises an optical fiber and a saturated, higher order Bragg grating therein having first and second order Bragg conditions. The optical fiber is selected to have a single mode operating wavelength region and, below a cutoff wavelength of the fiber, a multimode operating wavelength region. A Bragg grating is fabricated in this optical fiber such that the first order Bragg resonance wavelength of the Bragg grating is within the single mode operating wavelength region of the optical fiber and the second order Bragg resonance wavelength is below the cutoff wavelength of the fiber within the multimode operating wavelength region. Further, the higher order Bragg grating is fabricated with controllable second order reflectivity such that the reflectivities at the first and second order Bragg conditions are less than two orders of magnitude of one another. The improved sensor with this combination of features advantageously has a high degree of multiplexability so that large structural systems can be monitored with minimal instrumentation and at much lower cost as compared with prior art systems.

BRIEF DESCRIPTION OF DRAWINGS

FIG. 2 is a schematic illustration of a two-Bragg condition strain/temperature sensor according to the invention.

DETAILED DESCRIPTION

The improved optical fiber Bragg grating sensor of the invention and the method and apparatus employing the same, for measuring distributed strain and temperature at the same time use the first and second order Bragg conditions in a single saturated, higher order Bragg grating sensor to make strain and temperature measurements simultaneously. Advantageously, the invention is no more costly to manufacture than commercial gratings, has a well-conditioned set of equations for strain and temperature, preserves all of the multiplexing potential of Bragg gratings sensors, uses the same length of fiber to measure both strain and temperature, and can be used with any instrumentation capable of demodulation Bragg grating sensors.

In-fiber Bragg gratings use UV-induced periodicities in the core refractive index to reflect (ideally) as a single wavelength, known as the Bragg wavelength. Gratings are fabricated by interfering two beams from the UV laser to produce a periodic intensity distribution. This interference can be generated using holographic or phase mask techniques. Optical fibers with germanium, boron, and/or other more specialized doping materials are photosensitive, meaning that their refractive indices vary when their core is exposed to the UV light.

Experiments have shown that the refractive index changes rapidly upon initial exposure and then is asymptotic to a saturation level. Before saturation, change in refractive index is approximately linear with the UV radiance, so that the sinusoidal intensity distribution results in a sinusoidal refractive index distribution in the fiber core. The Bragg wavelength and the reflectivity are related through coupled mode theory to the length of the grating and the change in the refractive index. The common equation used to express the Bragg wavelength in terms of the mean refractive index (n) and the pitch of the periodicity (P) is given by $\lambda_B=2nP$. This expression is known as the "Bragg condition." This Bragg condition comes from coupled mode theory by assuming a sinusoidal index variation. A lesser known effect occurs as the refractive index begins to saturate under continued exposure to UV radiation. The resulting refractive index profile is still periodic with the same pitch, however, it is no longer sinusoidal. Instead, the index profile is represented by a Fourier series. Bragg conditions can be arrived at using this Fourier series with coupled mode theory that correspond to each of the terms in the series. This means that, in theory, saturated Bragg gratings reflect many discrete Bragg gratings.

Figure 1A:
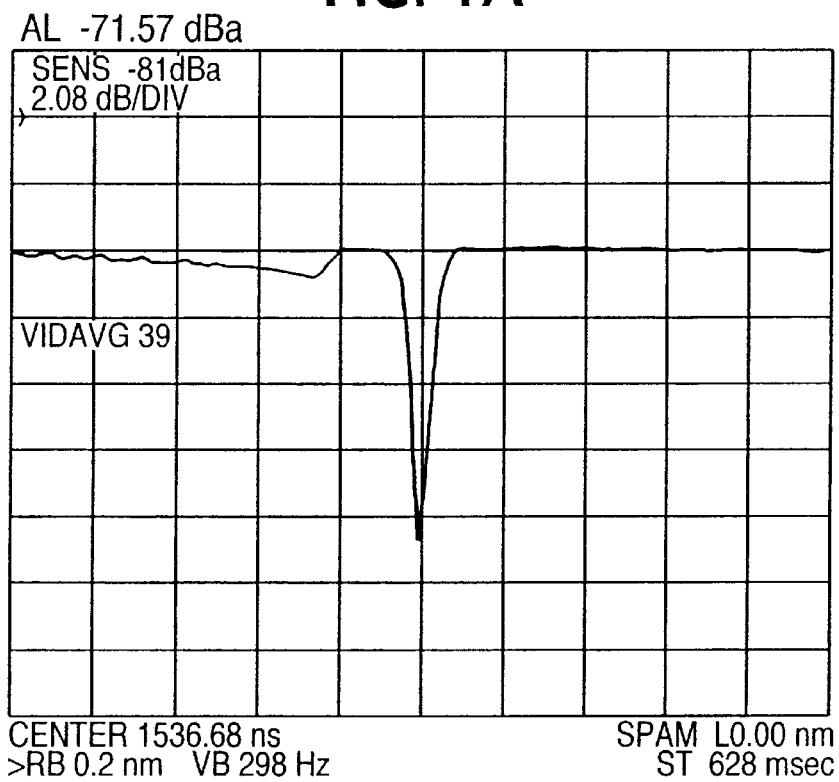
FIG. 1A shows the transmission spectra of first order Bragg condition from a saturated grating fabricated in Corning SMF/28/D5 fiber using a frequency doubled argon ion laser.
Figure 1B:
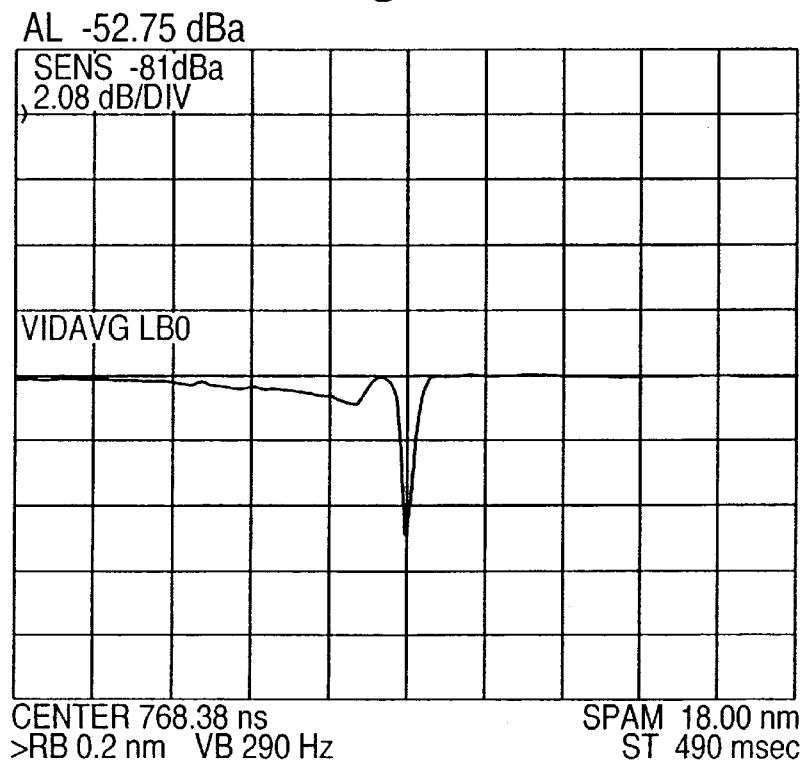
FIG. 1B shows the transmission spectra of second order Bragg condition from the saturated grating in the same fiber.

Of particular interest in the present invention are the Bragg conditions corresponding to the first two terms in the series—these are known as the first order and second order Bragg conditions. FIGS. 1A and 1B show the transmission spectra of first and second order Bragg conditions from a saturated grating engraved in Corning SMF/28/DS fiber of a sensor of the invention using a frequency doubled argon ion laser. It is noted that (1) the two spectra are similarly shaped, (2) the reflectivity of the second order grating is about half of the first order grating reflectivity, and (3) the Bragg wavelength of the second order grating is approximately half of the first order Bragg grating. Dispersion in the fiber prevents the gratings from being exactly a factor of two different. The reflectivities are intentionally within an order of magnitude of one another. In this regard, it is noted that the reflectivity of the second order Bragg condition is determined primarily by the Fourier coefficient of the second term in the series describing the index distribution through the fiber core. Stated another way, according to a feature of the invention, the reflectivities of the saturated, higher order Bragg grating at the first and second order Bragg conditions are made less than two orders of magnitude of one another, and preferably are approximately equal. It has been found that as a result of these features of the invention, together with the aforementioned relationship between optic fiber and Bragg grating characteristics, that the simultaneous measurement of strain and temperature can be achieved with a high degree of multiplexibility for large structural systems and at much lower cost as compared with prior systems.

While discovered in 1993, few applications for second order Bragg conditions have been proposed. With the present invention, the first and second order Bragg conditions of a single, higher order Bragg grating are preferably used in a dual wavelength arrangement similar to the one proposed by Xu et al. to simultaneously measure strain and temperatures. However, unlike Xu et al. who used two superposed gratings, in the present invention these simultaneous measurements are made using the single, saturated, higher order Bragg grating of the sensor.

The sensor 1 of the invention is shown schematically in FIG. 2. A saturated, higher order Bragg grating 2 in an optical fiber 10 of the sensor is illuminated through a 2×2 coupler 3 by a white light source 4 in the arrangement of FIG. 2. In the example, the reflected spectrum is then interrogated in an optical spectrum analyzer 5. This results in the following system of equations between strain, temperature and the wavelength shifts of the first and second order Bragg conditions:

$$\left\{ \begin{array}{c} \Delta\lambda_1 \\ \Delta\lambda_2 \end{array} \right\} = \left[ \begin{array}{cc} K_{\epsilon 1} & K_{T1} \\ K_{\epsilon 2} & K_{T2} \end{array} \right] \left\{ \begin{array}{c} \epsilon_{zz} \\ T \end{array} \right\} \quad (1)$$

where $\Delta\lambda_1$ and $\Delta\lambda_2$ are the wavelength changes of the first and second order Bragg conditions, $K_{\epsilon 1}$, $K_{T1}$, $K_{\epsilon 2}$ and $K_{T2}$ are the strain and temperature coefficients of the first and second order gratings, and $\epsilon_{zz}$ and T are the axial strain and temperature in the fiber. Experiments were performed using the grating whose spectrum is shown in FIG. 2 to measure the four coefficients in the above equation. The resulting system matrix for the strain and temperature is:

$$\left\{ \begin{array}{c} \Delta\lambda_1 \\ \Delta\lambda_2 \end{array} \right\} = \left[ \begin{array}{cc} 1.216\times10^{-5} & 8.500\times10^{-3} \\ 6.230\times10^{-4} & 4.100\times10^{-3} \end{array} \right] \left\{ \begin{array}{c} \epsilon_{zz} \\ T \end{array} \right\} \quad (2)$$

The condition number of this equation indicates strong stability in the inversion process required to solve for strain and temperature.

Figure 8:
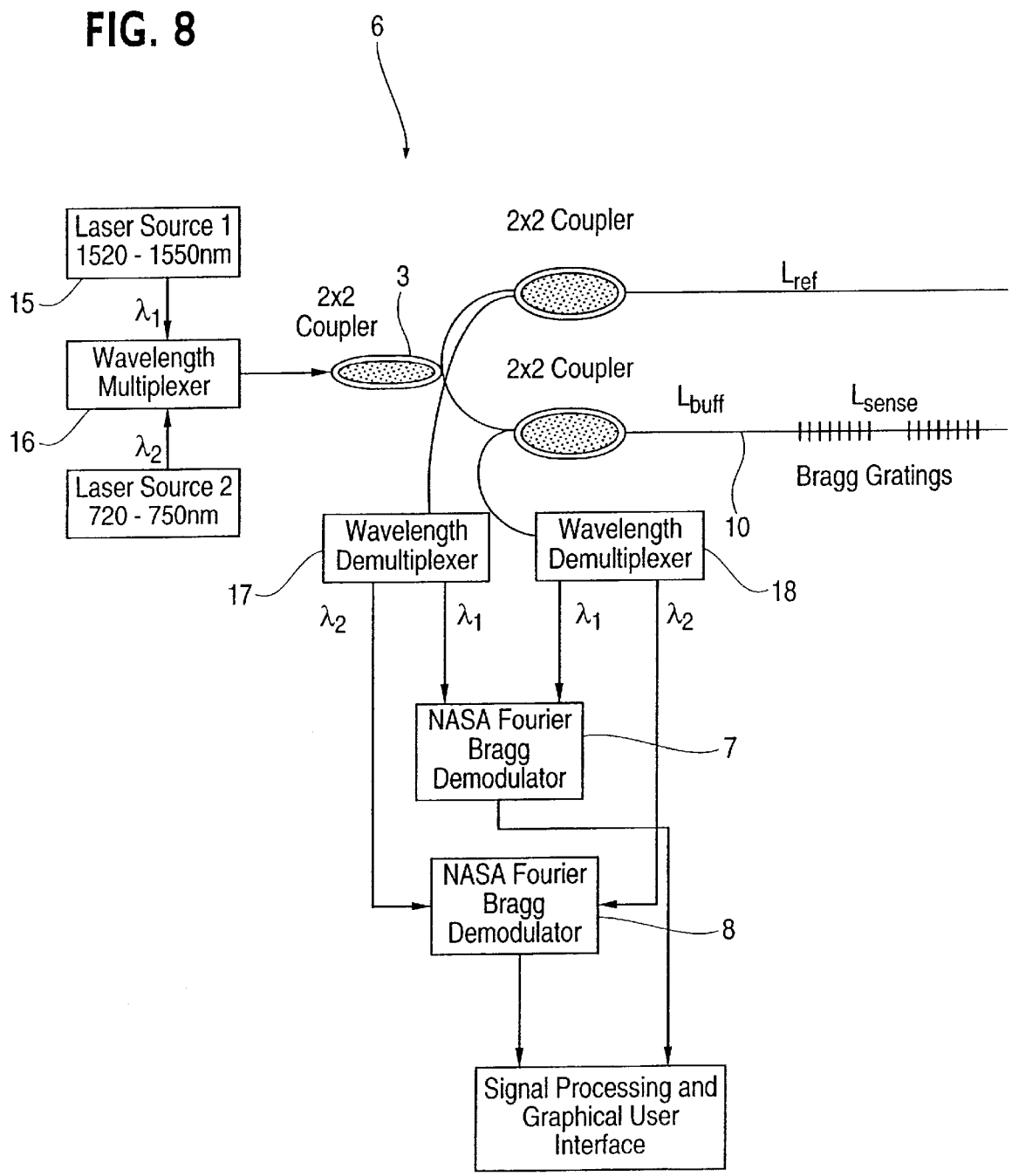
FIG. 8 is a schematic illustration of an apparatus of the invention employing a Fourier Bragg demodulation arrangement for two-Bragg condition strain/temperature sensors of the invention using two sources.

In the embodiment of the invention depicted in FIG. 8, the sensor 1 is used in an apparatus 6 with two Fourier Bragg Grating demodulators 7 and 8. Preferably, these demodulators are the kind developed at NASA LaRC, although other demodulators may be used. This demodulation, with its identical Bragg gratings 2, has serial multiplexing capability and will greatly reduce the cost of implementing a sensor system on large scale NASA relevant systems such as the RLV, for example. Fourier Bragg grating requires low reflectivity gratings; therefore, consideration is given to devising manufacturing conditions of an optimum second order Bragg condition according to the invention.

The Fourier Bragg grating demodulation system in the apparatus 6 of FIG. 8 is sensitive to down-fiber power loss as a result of all gratings 2 therein having to share the same wavelength. Therefore, according to a further feature of the invention, the optical fiber is selected such that its cutoff wavelength, in relation to the first and second order Bragg wavelengths of the Bragg gratings 2 fabricated therein, will avoid excessive macrobending and microbending losses at the larger Bragg wavelength. It has been found that this can be accomplished in the sensor 1 by using an optical fiber 10 having a single mode operating wavelength region and below a cutoff wavelength of the fiber having a multimode operating wavelength region, in combination with a saturated, higher order Bragg grating 2 whose first order Bragg resonance wavelength is within the single mode operating wavelength region of the optical fiber and whose second order Bragg resonance wavelength is below the cutoff wavelength of the fiber within the multimode operating wavelength region. This combination of features, together with the use of a saturated, higher order Bragg grating having reflectivities at the first and second order Bragg conditions which are of the same general magnitude, e.g., less than two orders of magnitude of one another, surprisingly results in an improved sensor and apparatus employing the same that facilitate the simultaneous measurement of distributed strain and temperature in a novel way while enabling multiplexing of the sensors and cost effective implementation.

The apparatus 6 further comprises a mode stripper 9 to eliminate the higher order propagation modes at the second order Bragg condition of the gratings 2. The mode stripper does have finite insertion loss, but this insertion loss will be the same for all gratings and will be independent of the strain and temperature fields.

In order to make the optical fiber Bragg grating 2 with controllable second order reflectivities as referred to above, waveguide modeling was performed. The model included the effects of non-sinusoidal index periodicity and multiple propagation modes, and made it possible to calculate the amplitude of the reflected waves of a periodic Bragg grating in an optical fiber for a given incident wave, in determining the length and writing conditions for fabricating a saturated Bragg grating having first and second order Bragg conditions with controllable second order reflectivity for a given incident wave.

Propagation constants of the propagating modes in the optical fiber 10 were obtained as input for the waveguide model by solving numerically an eigenvalue equation formulated using the electric field boundary condition at the interface of a core and a cladding of the optical fiber. The modeling also required data describing the change in refractive index as a function of exposure time and power in the optical fiber. This data was measured as part of the modeling task.

In parallel with the modeling efforts, it was necessary to perform extensive grating fabrication experiments to attempt to empirically determine the grating fabrication conditions that lead to strong and controllable second order Bragg conditions. These tests included writing gratings using different combinations of optical power, exposure time, hydrogen loading, and apodization to determine the parameters that dominate the formation of the second order Bragg condition. In these tests, the growth of the two Bragg conditions was documented using an optical spectrum analyzer. Gratings were fabricated using a frequency double argon ion laser in a phase mask arrangement, all of which was housed in a class 1000 clean room environment. The phase mask arrangement was used so as to improve repeatability in the grating writing conditions.

As part of the experimentation, strain and temperature coefficients ($K_{\epsilon 1}$, $K_{T1}$, $K_{\epsilon 2}$ and $K_{T2}$ in Eq. (1)) were measured at two different combinations of first and second order Bragg wavelengths corresponding to 1300 nm and 1550 nm phase masks. All coefficients were compared to theoretical predictions using wavelength-strain-temperature models for surface mounted Bragg grating sensors. The strain and temperature coefficients were obtained using the experimental arrangement shown in FIG. 3. In this configuration, the grating 2 is bonded adjacent to a thermistor 11 and opposite to a resistance strain gage 12 on the surface of a cantilever beam 13. A Peltier device 14, which is an electrically driven heat exchanger, is placed on top of the fiber optic sensor 1. The temperature of the specimen can therefore be accurately controlled using programmable current source while at the same time the strain can be controlled using an electromechanical shaker to apply controlled tip displacements to the cantilever beam. This arrangement has proven very useful for investigating simultaneous strain/temperature sensors because an arbitrary thermomechanical strain state can be applied to the sensor region without the added complexity of having to operate a load frame inside a furnace. In addition to measuring the strain and temperature coefficients, this experimental arrangement was used to quantify cross-sensitivity between the strain and temperature responsivity of the sensor. The first and second order Bragg conditions were demodulated using an optical spectrum analyzer. The internal white light source of the optical spectrum analyzer was used to illuminate the grating in both Bragg conditions.

Figure 3:
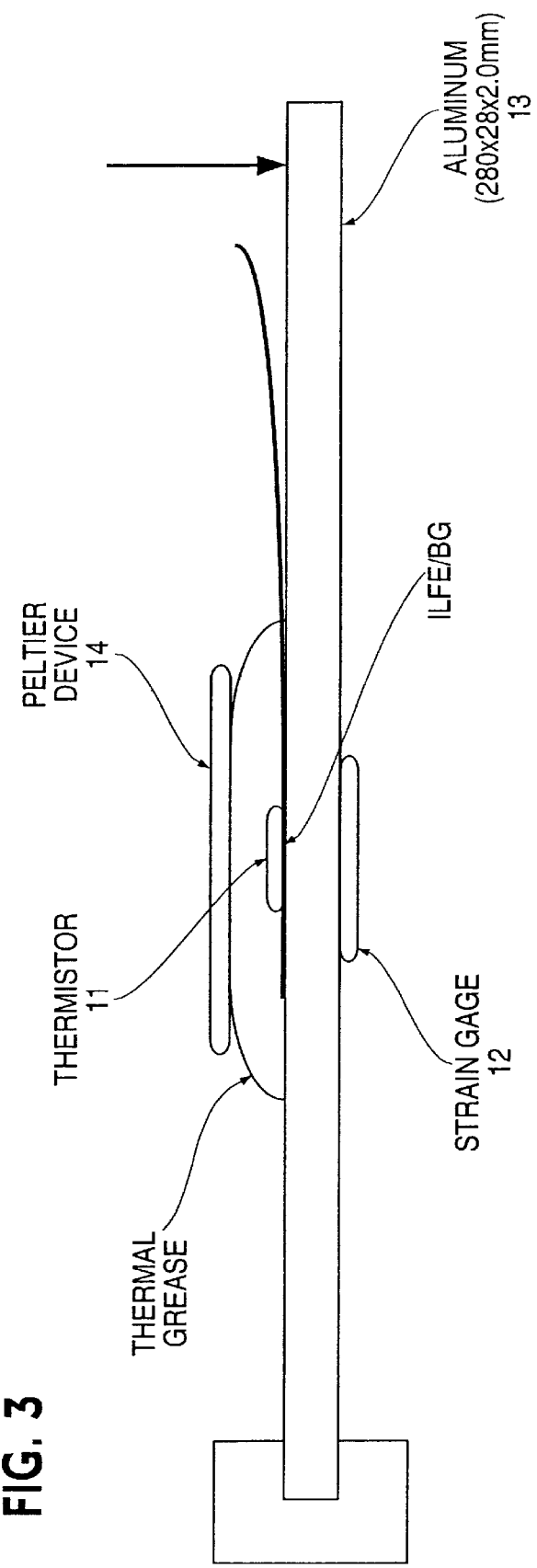
FIG. 3 is a schematic showing of an experimental setup that was used to determine calibration coefficients of two-Bragg conditions.

Using the strain and temperature coefficients determined in these experiments, the two-Bragg condition strain/temperature sensor 1 was tested under different combined strain and temperature loading conditions applied using the experimental arrangement in FIG. 3. Sensor demodulation was done using the optical spectrum analyzer. The tests demonstrated the feasibility of the strain/temperature sensors, and helped to develop experimental estimates of the strain and temperature resolution of the sensors.

According to a previous work by Brady et al., "Recent Developments in Optical Fiber Sensing Using Fiber Bragg Gratings," SPIE Proceedings, Colorado, 1996, Vol. 2839, pp.8–14, the reflectivity of the second order diffraction is expected to be very small (~0.1% for a grating of about 15% primary resonance reflectivity). One aim of the extensive experiments conducted by applicants was to overcome this limitation of the prior art. As part of this effort, in applicants' experimentation, gratings were fabricated at wavelengths centered about 1550 nm in hydrogen loaded corning SMF28 fibers in an attempt to induce the higher order resonances. Ten such gratings were fabricated with fundamental reflectivities of 70%, 80%, 90%, 93.7%, 96%, 98.4%, 99%, 99.4%, 99.7% and 99.9%. These gratings were written using a frequency-doubled Argon Ion laser at 60 mW power at 244 nm. No second order Bragg conditions were observed in these gratings. It was estimated that the second order wavelength is well below the single mode cutoff wavelength (~1260 nm) of Corning SMF28 fiber, which might have made it difficult to see a strong second order Bragg spectrum. Different tests were performed with the available fibers to experimentally see the wavelength encoded optical signal from the grating when the Bragg resonance wavelength falls below the cutoff wavelength of the fiber. The results of these tests are summarized in Table 1.

TABLE 1

Spectral characteristics of Bragg gratings written in different types of fibers

| | TEST FIBER TYPE | GRATING PERIOD | EXPOSURE TIME | OBSERVED SPECTRAL CHARACTERISTICS |
|---|---|---|---|---|
| 1 | Corning SMF 28 (Cutoff 1190 nm–1330 nm) | 0.5335 µm | ~15 min. | Strong primary resonance at 1554.3 nm. Reflectivity ~ 25dBm No second order resonance spectrum |
| 2 | Corning SMF 28 (Cutoff 1190 nm–1330 nm) | 0.2689 µm | ~15 min. | Multiple weak resonances centered around 780 nm. Average reflectivity ~1.5dBm (FIG. 1) |
| 3 | Corning Multimode fiber | 0.5335 µm | ~10 min. | Multiple resonances and high lossy |

TABLE 1-continued

Spectral characteristics of Bragg gratings written in different types of fibers

| TEST | FIBER TYPE | GRATING PERIOD | EXPOSURE TIME | OBSERVED SPECTRAL CHARACTERISTICS |
|---|---|---|---|---|
| | (core diameter 50 μm) | | | modes below 1560 nm |
| 4 | 3M FS-SN-3221 (cutoff ~620 nm) | 0.2689 μm | ~10 min. | Strong primary resonance centered at 781 nm. Reflectivity ~10 dBm |
| 5 | 3M FS-SN-3221 (cutoff ~620 nm) | 0.5335 μm | ~10 min. | No primary resonance No secondary resonance |

In Test 1, a grating of center wavelength 1544.3 nm was fabricated in a hydrogen loaded Corning SMF28 fiber. The reflectivity of this grating reached about 25 dBm in about 15 minutes. The primary resonance (1554.3 nm) was almost at the saturation level and the secondary resonance was expected at about 785 nm, which is far below the cutoff wavelength (~1260 nm) of the fiber used. However, a secondary resonance was not observed. Because there was no visible secondary resonance, a grating having primary Bragg wavelength at about 780 nm (Test 2 in Table 1) was fabricated to see the number of guided modes and the associated Bragg wavelengths supported by the Corning SMF28 fiber (~cutoff wavelength 1260 nm) at this wavelength. A calculated value for the number of modes at 780 nm using the fiber parameters provided by the fiber manufacturer is 4.

Figure 4A:
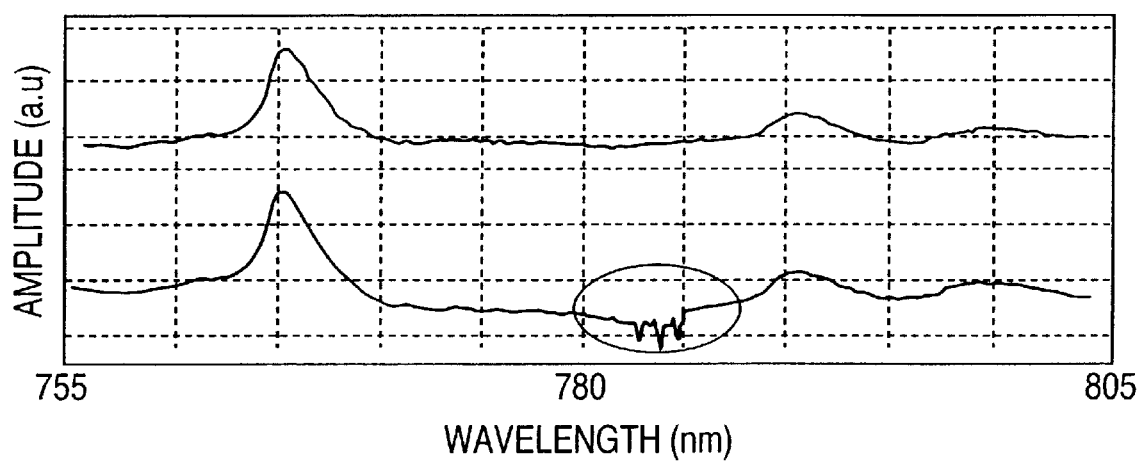
FIG. 4A shows the transmission spectrum from Test 2 of the light source without grating.
Figure 4B:
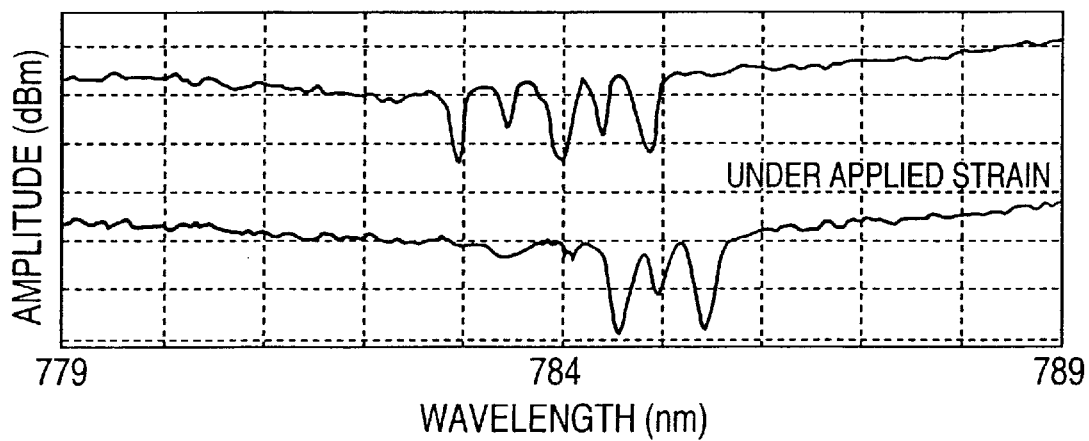
FIG. 4B is the transmission spectrum from Test 2 of the light source showing multiple second order Bragg resonances around 780 nm.

The transmission spectrum from Test 2 is shown in FIGS. 4A and 4B. The top graph in FIG. 4A shows the spectrum of the light source without grating, and the bottom graph in FIG. 4A shows multiple Bragg resonances around 780 nm. FIG. 4B, which is the enlarged graph of circled area in FIG. 4A, clearly shows five Bragg peaks that correspond to five guided modes at 780 nm wavelength range. The discrepancy between the calculated and the observed value for the number of modes is due to the fact that numerical aperture (NA) of the fiber used in this calculation is for 1300 nm–1550 nm wavelength range. This value for the NA is slightly higher than would be expected at 780 nm. A small strain was applied to the grating and the Bragg spectra was monitored in the optical spectrum analyzer. The observed shift in Bragg spectra (bottom graph of FIG. 4B) confirms that these peaks are in fact from the Bragg grating only. Applying strain caused some of the modes to be stripped, which reduced the number of visible reflection peaks from five to three. The strength of each resonance is considerably weaker (~1.5 dBm) in comparison with the grating used in Test 1.

The fiber and the writing conditions were the same for Test 1 and 2, just the fundamental Bragg wavelength was shifted from 1554.3 nm to 780 nm. In order to test the effect on a Bragg spectrum when a large number of modes satisfy the Bragg condition in a fiber Bragg grating, a Bragg grating of primary wavelength 1544 nm was written in a hydrogen loaded large core (50 μm diameter) multimode Corning fiber. In this test (Test 3 in Table 1), the lossy modes (both radiation and cladding modes) were observed to be dominant and there were no distinguishable peaks corresponding to any guided mode. Test 4 was performed to check the photosensitivity of another fiber (3M FS-SN-3221) having a low cutoff wavelength (620 nm). Therefore, Bragg gratings written at communications wavelengths would result in second order Bragg conditions in the single mode operating wavelength region of this fiber. Bragg gratings of primary wavelength centered at 780 nm were written in a hydrogen loaded 3M FS-SN-3221 fiber under the same writing conditions as used in Tests 1 and 2 except for the writing time was about 10 min. It was found from the test (Test 4 in Table 1) that the 3M FS-SN-3221 fiber is photosensitive enough to write index gratings. Gratings of primary wavelength centered about 1544 nm were then fabricated in hydrogen loaded 3M FS-SN-3221 fiber (Test 5 in Table 1) and the transmission spectra in 1544 nm and 780 nm wavelength region were monitored. At 1550 nm wavelength region, no optical signal was observed. This is due to the small core size (~3.5 μm diameter) of the fiber which minimized light coupling from the light source to the fiber. The writing conditions used in this Test were the same as used in Test 4, except for the center wavelength, and it is believed that the grating at center wavelength of 1544 nm must have been written in the fiber. Also, no response at 780 nm wavelength region was found though the light coupled from the white light source to the fiber was high enough (0.1 nW/nm) to observe the Bragg peaks in the optical spectrum analyzer. This indicates that either the second order Bragg peak is too small to notice, or that the second order Bragg condition was not induced at all for the grating writing conditions used From the initial test results, it was decided to use a fiber with core size as large as possible in order to get a maximum coupling efficiency while keeping the cutoff wavelength in the 780 nm range. This choice ensured that the second order writing Bragg conditions are in the single mode operating wavelength region when writing primary gratings at about 1550 nm wavelength, since it was desired to find a fiber that would be single mode for both the first (~1550 nm) and second (~780 nm) order Bragg conditions. However, after conducting macrobend loss calculations in different types of optical fibers using a simplified model, it was concluded that it is not possible, for sensor applications, to select an optical fiber that will have single mode for both 780 nm and 1550 nm wavelengths, and have acceptable loss at 1550 nm.

Figure 5A:
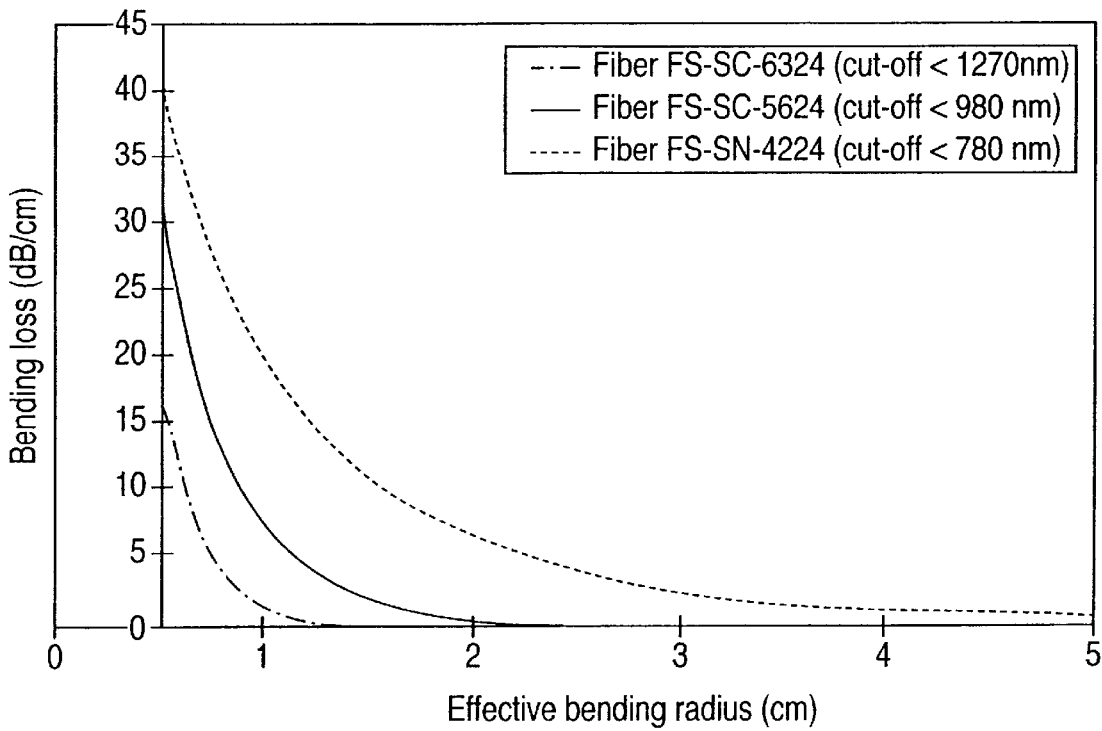
FIG. 5A depicts calculated bending loss for three different types of 3M fibers at 1550 nm.

More particularly, FIG. 5A shows the theoretical bending loss curves as a function of fiber bend radius calculated for three different types of 3M fibers at 1550 nm wavelength using infinite cladding model. It is to be noted that the units on the vertical axes are dB/cm, as opposed to the dB/km often used to characterize loss in optical fiber. This alone suggests that bending loss may be significant. The 3M fibers modeled in FIG. 5A are Fiber FS-SN-4224, Fiber FS-SC-5624, and Fiber FS-SC-6324. Fiber FS-SN-4224 has cutoff wavelength of less than 780 nm such that light propagation in 780 nm wavelength is single moded. The plot corresponding to this fiber shows a loss which is greater than 50% every centimeter, for bending radii less than 3.2 cm. This is clearly not suitable for sensor applications. Fibers of this type will be very sensitive not only to large bends but also to weak transverse strain because of large cladding field. Fiber FS-SC-5624 has a cutoff wavelength of 980 nm and barely supports two modes at 780 nm wavelength. The loss is significantly lower than that in the FS-SN series fiber. If the second mode is not excited at the second Bragg resonance wavelength or if one of the modes can be stripped, FS-SC-5624 is a better fiber from the standpoint of losses. The third fiber, FS-SC-6324, has even higher cutoff wavelength of 1130 nm, and supports four propagation modes at 780 nm. Also, the loss is much lower compared to the other two fibers. Again, the use of this type of fiber depends on successful mode stripping.

Figure 5B:
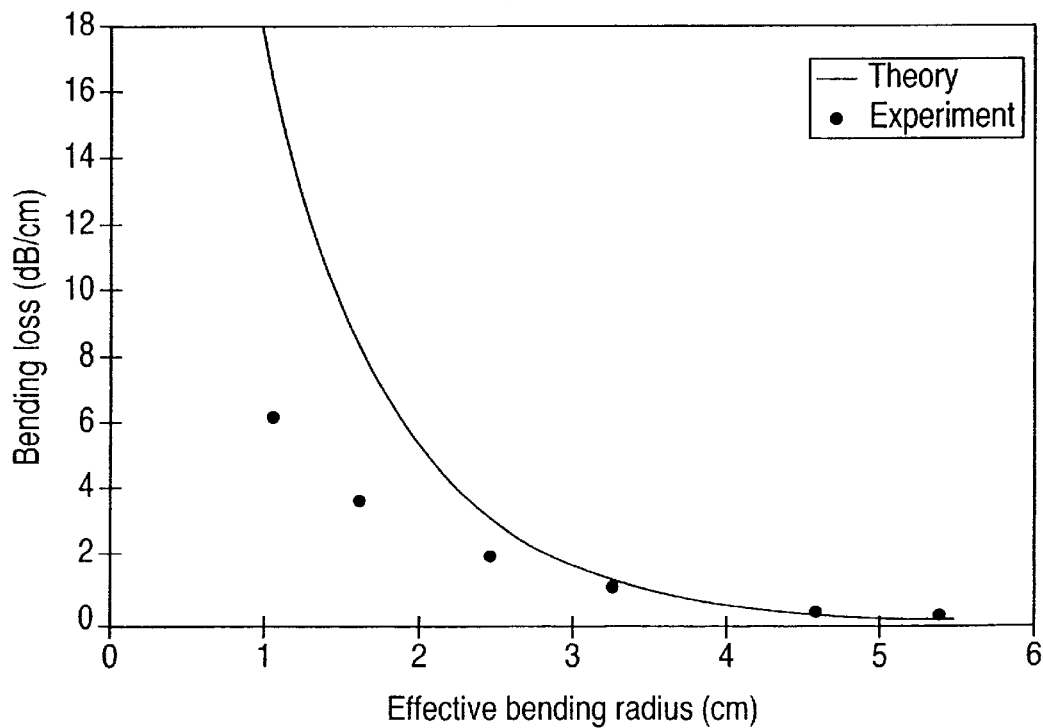
FIG. 5B illustrates theoretical and experimental bending loss in a SpecTran F-SC type fiber, having a cutoff wavelength of 780 nm±40 nm, at 1550 nm.

The bending loss was also measured in order to verify the theoretical model. FIG. 5B shows the result of the experiment. The fiber used in this experiment is a F-SC type SpecTran fiber which has cutoff wavelength of 780 nm and NA of 0.11. The model does not agree well with experiments for small bending radii, but matches well for bending radii about 3 cm. The deviation at higher bending radii may be due to the finite size of the cladding and acralyte coating of the fiber, which are not accounted for in the mathematical models used. An exact calculation was done by Faustini and Martini, "Bend loss in single mode fibers," *J. Lightwave Tech.*, vol. 15, No. 4, pp. 671–679, April 1997, using a tedious mathematical formulation. However, because of the aforementioned results of comparing loss in different fibers using the simple model, a detailed calculation was not needed.

The results of the analyses and experiments suggest that it is not possible to select an optical fiber that will have single mode for both 780 nm and 1550 nm wavelengths, and have acceptable loss at 1550 nm. Thus, according to the invention, the optical fiber and Bragg grating are selected, and fabricated, respectively, such that the sensor operates with the lower wavelength Bragg reflection in the multimode region.

During the experiments with Bragg gratings it was also found that the primary Bragg resonance must reach very high reflectance (~50 dB) in order to induce the second order Bragg resonance. A low power (50 mW–100 mW) CW FRED laser was used to fabricate the grating. The lower power resulted in a long exposure time (~30 minutes) and caused fabrication difficulties. During the long exposure time, the laser pointing stability and the external perturbations tended to bleach the Bragg grating before it reached the reflectivity needed. For this reason, it is preferred that the gratings be fabricated using a high power laser, such as an excimer laser.

On the basis of the foregoing test results and conclusions, further studies were conducted and it was found, surprisingly, that strong second order Bragg resonances were observed in fiber Bragg gratings written in communications grade fibers. The primary resonance wavelength of the grating was in the range of 1550 nm. The grating was fabricated using a high power laser. A Xenon white light source was used to investigate the second order Bragg resonances which falls in the 780 nm wavelength range for the grating used.

Figure 6A:
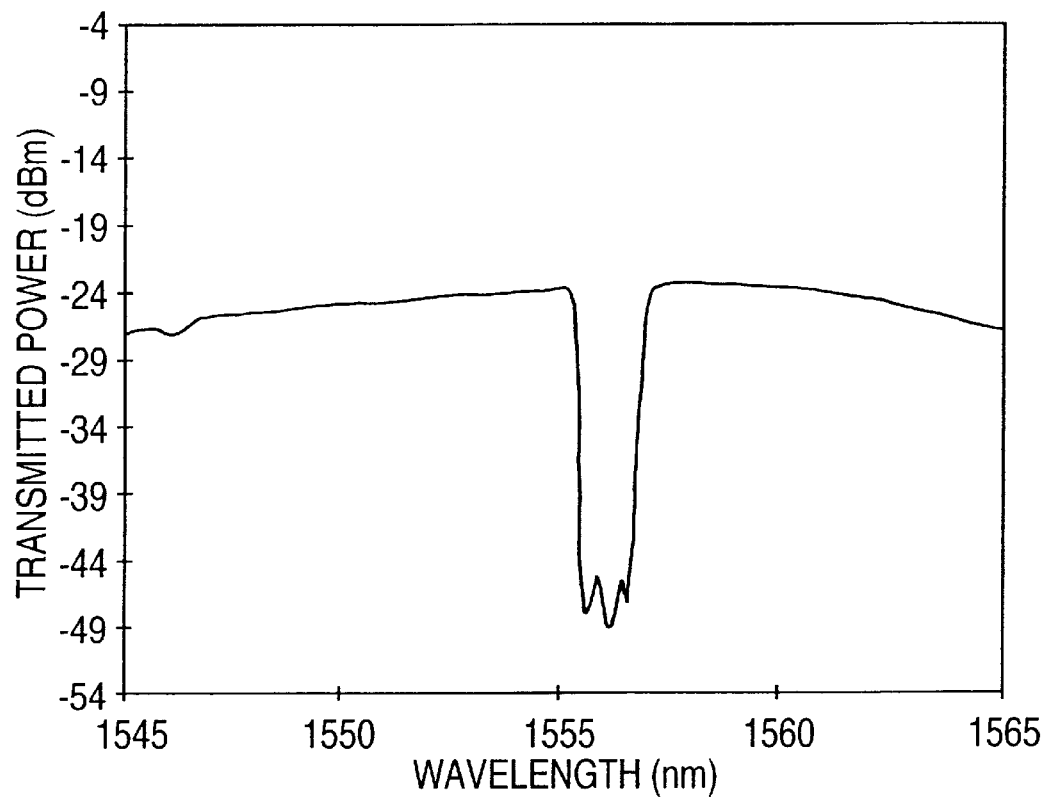
FIG. 6A shows the saturated primary Bragg resonance at about 1556 nm in a fiber Bragg grating written in communications grade optical fiber.
Figure 6B:
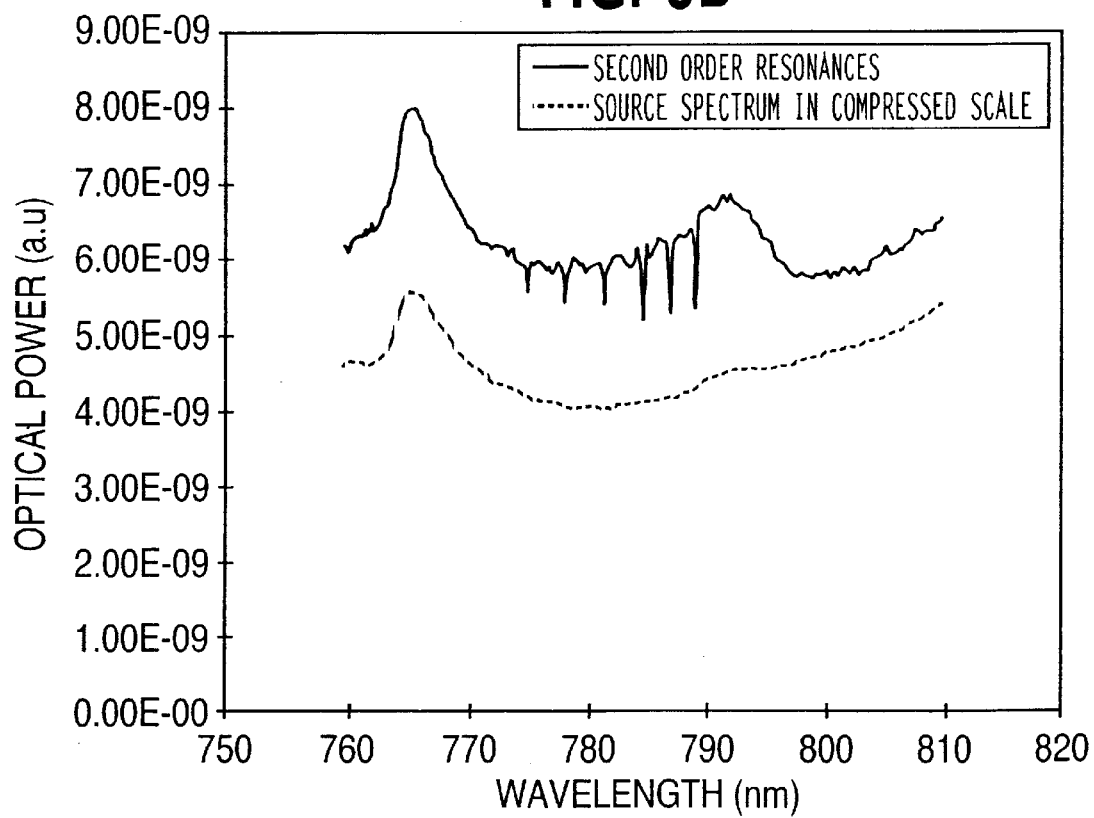
FIG. 6B depicts the second order resonances at about 780 nm range for the same optical fiber and the light source spectrum with no grating.

FIG. 6A shows the saturated primary Bragg grating at 1556 nm. The saturation condition on the primary grating changes the index modulation to a non-sinusoidal saturation and thereby induces the second order resonance condition. In other words, the second order resonance starts to grow as soon as the second coefficient in the Fourier expansion of the index modulation becomes non-zero. FIG. 6B shows the observed multiple second order resonances, the strongest at 780 nm (see FIG. 7A), corresponding to six different propagating modes. The estimate of the V-number at 780 nm for the fiber used in this experiment is less than six which limits the number of propagating modes to six. This is an excellent agreement with the observed number of modes. The lower trace is the actual shape of the light source used and is given here in a compressed scale for comparison. A mode stripping experiment was also performed to explore the possibility of obtaining a single peak corresponding to the second Bragg condition. In this test, the optical signal from the grating was sent through a 1 meter long SpecTran F-SE type fiber having a specified cutoff wavelength of 780, and the signal observed using an ADVANTEST Q8347 Optical Spectrum Analyzer. The resulting signal is shown in FIG. 7B.

Figure 7A:
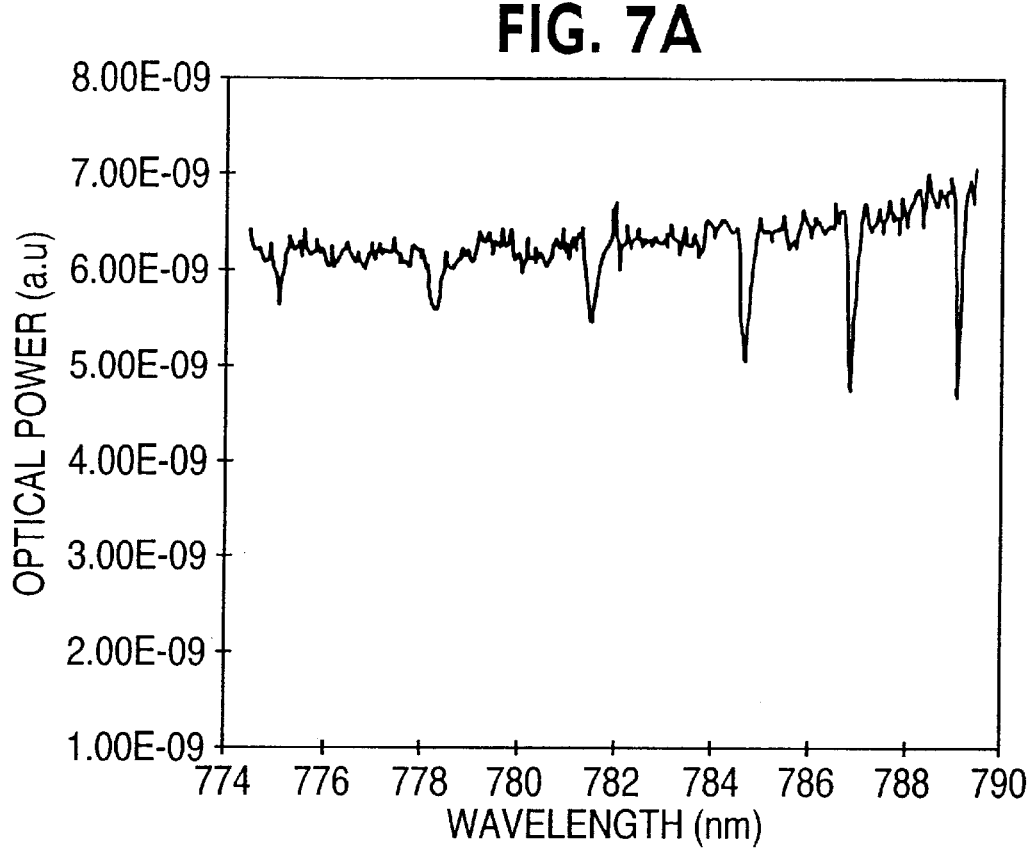
FIG. 7A corresponds to FIG. 6B but shows the six different propagating modes in more detail.
Figure 7B:
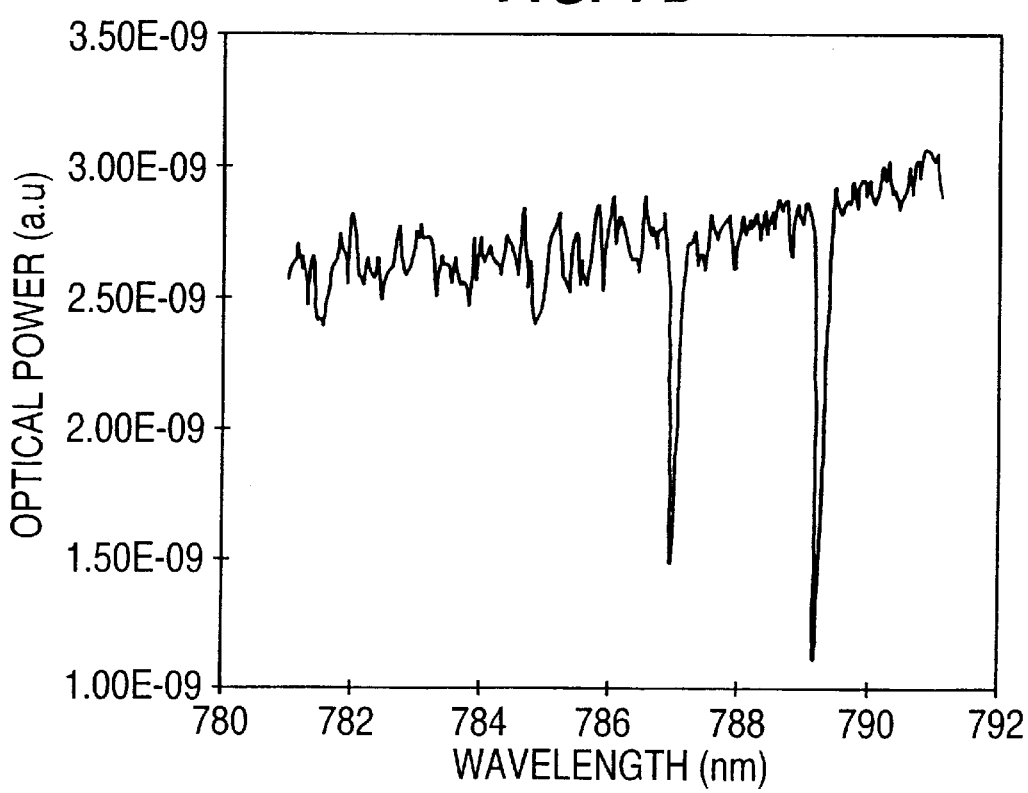
FIG. 7B shows the signal after mode stripping by sending the optical signal from the gating through a 1 meter long SpecTran F-SE type fiber, which has a specified cutoff wavelength of 780 nm, the signal being observed using an ADVANTEST Q8347 Optical Spectrum Analyzer.

FIG. 7A shows all the resonances in a 15 nm span before the signal was mode stripped. FIG. 7B shows the signal after passing through the F-SE fiber. Clearly four of the six modes have either completely disappeared or they are negligibly small. When the F-SE fiber is bent to a radius as small as one centimeter several times the remaining two modes appeared to be unchanged. This indicates that these modes are not cladding modes, which implies that the fiber can barely support two modes at this wavelength range. During this test, the fibers were not spliced, instead a fiber-fiber connector was used. This procedure could have influenced the excessive loss in some of the modes, as well as the launching conditions of the light from large core fiber to small core fiber. Tests on temperature and strain characteristics of these two resonances and an investigation of the polarization properties of these modes are then used in order to choose the resonance mode of these two modes for sensing applications.

The apparatus 6 in FIG. 8 is an implementation according to one form of the invention for distributed measurement using Fourier Bragg grating demodulation. The apparatus comprises two laser sources 15 and 16. One source 15 is chosen to have the wavelength corresponding to the first Bragg condition and the second source 16 with the second Bragg condition wavelength. The output from these two sources is combined using a wavelength multiplexer 17. The output of the wavelength multiplexer is fed to the fiber optic sensor 1. A wavelength demultiplexer (WDM) 18 is used to separate the first and second order Bragg reflections from the sensor. Two independent Fourier Bragg demodulators 7 and 8 are used to demodulate the signal. The output of the demodulator is used to form two simultaneous equations for strain and temperature.

Using the preferred NASA LaRC Fourier Demodulation System operating simultaneously at two wavelengths, a wavelength division multiplexer 18 is incorporated into the system. The fibers used in the wavelength demultiplexer should be carefully selected in order to avoid excessive loss. WDMs in the wavelengths 1550 nm/780 nm are to be used.

In the apparatus 6 using Fourier Bragg Grating Demodulation low reflectivity (less than 5%) first and second order Bragg conditions are preferably fabricated. Obtaining second order Bragg conditions requires that the Bragg gratings be saturated. However, gratings usually get saturated while attempting to achieve high reflectivity gratings, which is just the opposite of what is needed for Fourier Bragg Grating Demodulation. Fortunately, the grating reflectivity is determined by the change both in the refractive index and grating length. According to the invention, the models developed are used to estimate the grating length and other writing parameters required to produce the desired reflectivity. Thus, the model results as a guideline to fabricate low reflectivity gratings.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A Bragg grating sensor for measuring distributed strain and temperature at the same time, said sensor comprising an optical fiber and a saturated, higher order Bragg grating therein having first and second order Bragg conditions, said optical fiber having a single mode operating wavelength region and below a cutoff wavelength of said fiber having a multimode operating wavelength region, a first order Bragg resonance wavelength of said Bragg grating being within said single mode operating wavelength region of said optical fiber and a second order Bragg resonance wavelength being below said cutoff wavelength of said fiber within said multimode operating wavelength region, and the reflectivities of said saturated Bragg grating at the first and second order Bragg conditions being less than two orders of magnitude of one another.

2. The Bragg grating senor according to claim 1, wherein said reflectivities of said saturated Bragg grating at the first and second order Bragg conditions are approximately equal.

3. The Bragg grating sensor according to claim 1, wherein the diameter of a core of said optical fiber is greater than or equal to about 5 μm.

4. The Bragg grating sensor according to claim 1, wherein the reflectivities of said saturated Bragg grating at the first and second order Bragg conditions are each less than 5%.

5. The Bragg grating sensor according to claim 1, wherein said first order Bragg resonance wavelength is in the range of 1550 nm and said second order Bragg resonance wavelength is in the range of 780 nm and said optical fiber has a cut-off wavelength of approximately 1250 nm.

6. The Bragg grating sensor according to claim 1, wherein the number of different propagating modes in said optical fiber at said second order Bragg resonance wavelength is five or more.

7. The Bragg grating sensor according to claim 1, wherein said optical fiber at said first order Bragg resonance wavelength has a macrobend loss of less than 50% every centimeter with a bending radius of 3 cm.

8. The Bragg grating sensor according to claim 1, wherein said optical fiber is a communications grade fiber.

9. A method of making an optical fiber Bragg grating sensor for measuring distributed strain and temperature at the same time, said method comprising the steps of:

utilizing a coupled-mode waveguide model of an optical fiber, which model includes the effects of non-sinusoidal index periodicity and multiple propagation modes and is capable of calculating the amplitude of the reflected waves of a periodic Bragg grating in an optical fiber for given incident wave, in determining the length and writing conditions for fabricating a saturated Bragg grating having first and second order Bragg conditions with controllable second order reflectivity for a given incident wave, and using said waveguide model as a guideline in fabricating a saturated, higher order Bragg grating having first and second order Bragg conditions in an optical fiber having a single mode operating wavelength region and below a cutoff wavelength of said fiber having a multimode operating wavelength region, a first order Bragg resonance wavelength of said Bragg grating being within said single mode operating wavelength region of said optical fiber and a second order Bragg resonance wavelength being below said cutoff wavelength of said fiber within said multimode operating wavelength region, and the reflectivities of said saturated Bragg grating at the first and second order Bragg conditions are less than two orders of magnitude of one another.

10. The method according to claim 9, wherein said step of utilizing a coupled-mode waveguide model includes calculating the amplitude $A_{mi}(O)$ of the reflected wave at Z=0, the forward/incident end of the grating along the Z-direction for the ith propagating mode due to the mth term of the Fourier series expansion of the periodic reflective index of the Bragg grating for a given incident wave according to the equation $$A_{mi}(O) = \frac{-2jP_i\Omega_{mi}\sinh\frac{sL}{2}}{-\delta\sinh\frac{sL}{2} + js\cosh\frac{sL}{2}}$$

where L is the length of the grating along the Z-direction, $P_i$ is the amplitude of the ith propagation mode of the incident wave, and $\Omega_{mi}$ is the coupling coefficient for the ith propagation mode due to the mth Fourier expansion term of the refractive index distributor within the Bragg grating.

11. The method according to claim 10, including obtaining propagation constants of the propagating modes in the optical fiber as input for said waveguide model by solving numerically an eigenvalue equation formulated using the electric field boundary condition at the interface of a core and a cladding of said optical fiber.

12. The method according to claim 9, including fabricating said Bragg grating by exposing the material of the grating to a laser so that a primary Bragg resonance reaches a reflectance of at least approximately 50 dB in order to induce a second order Bragg resonance.

13. The method according to claim 9, including fabricating said Bragg grating using a phase mask arrangement and a laser.

14. The method according to claim 13, wherein said laser is a high power excimer laser.

15. A method of making an optical fiber Bragg grating sensor for measuring distributed strain and temperature at the same time, said method comprising:

selecting an optical fiber having a single mode operating wavelength region and below a cutoff wavelength of said fiber having a multimode operating wavelength region, and fabricating in said optical fiber a saturated, higher order Bragg grating having first and second order Bragg conditions, a first order Bragg resonance wavelength of said Bragg grating being within said single mode operating wavelength region of said optical fiber and, a second order Bragg resonance wavelength being below said cutoff wavelength of said fiber within said multimode operating wavelength region, and the reflectivities of said saturated Bragg grating at the first and second order Bragg conditions being less than two orders of magnitude of one another.

16. The method according to claim 15, wherein said step of fabricating includes exposing the material of the grating to a laser so that a primary Bragg resonance reaches a reflectance of at least approximately 50 dB in order to induce a second order Bragg resonance.

17. The method according to claim 15, wherein said higher order Bragg grating is fabricated while the optical fiber is being manufactured.

18. The method according to claim 15, wherein said sensor is fabricated using a single optical pulse from a high power laser.

19. An apparatus for measuring distributed strain and temperature at the same time, said apparatus comprising:

a fiber optic sensor having a Bragg grating with first and second order Bragg conditions in an optical fiber, said optical fiber having a single mode operating wavelength region and below a cutoff wavelength of said fiber having a multimode operating wavelength region, a first order of Bragg resonance wavelength of said Bragg grating being within said single mode operating wavelength region of said optical fiber and a second order of Bragg resonance wavelength being below said cutoff wavelength of said fiber within said multimode operating wavelength region, and the reflectivities of said Bragg grating at the first and second order Bragg conditions being less than two orders of magnitude of one another, and a dual-Bragg wavelength demodulation arrangement for receiving a signal from said sensor and demodulating the signal.

20. The apparatus according to claim 19, wherein said dual-Bragg wavelength demodulation arrangement comprises two independent Fourier Bragg demodulators.

21. The apparatus according to claim 19, further comprising a plurality of identical ones of said fiber optic sensor with identical Bragg wavelengths arranged in an array.

22. The apparatus according to claim 19, further comprising light source means for providing light to said sensor at each of the first and second order of Bragg resonance wavelengths.

23. The apparatus according to claim 22, wherein said light source means comprises two lasers.

24. The apparatus according to claim 23, further comprising a wavelength multiplexer for feeding the outputs of said two lasers to said fiber optic sensor.

25. A method for measuring distributed strain and temperature at the same time, said method comprising:

simultaneously creating first and second order Bragg conditions at respective wavelengths in a single Bragg grating of a fiber optic sensor, wherein the reflectivities of said Bragg grating at the first and second order of Bragg conditions are less than two orders of magnitude of one another, demodulating a signal from said sensor with respect to each of the wavelengths corresponding to the first and second order of Bragg conditions, and forming two simultaneous equations for strain and temperature using the demodulated output of said sensor.

26. The method according to claim 25, wherein the reflectivities of said Bragg grating at the first and second order of Bragg conditions are approximately equal.

27. The method according to claim 25, including mode stripping the signal from said sensor with respect to the second order Bragg condition at a Bragg resonance wavelength.

* * * * *